(12) United States Patent
Raphaeli et al.

(10) Patent No.: US 8,576,903 B2
(45) Date of Patent: Nov. 5, 2013

(54) TECHNIQUES FOR ADAPTIVELY ADJUSTING DECISION LEVELS OF A PAM-N DECISION FEEDBACK EQUALIZER

(75) Inventors: Dan Raphaeli, Kfar Saba (IL); Yaron Slezak, Raanana (IL)

(73) Assignee: TranSwitch Corporation, Shelton, CT (US)

( * ) Notice: Subject to any disclaimer, the term of this patent is extended or adjusted under 35 U.S.C. 154(b) by 106 days.

(21) Appl. No.: 13/275,811

(22) Filed: Oct. 18, 2011

(65) Prior Publication Data

US 2013/0094561 A1      Apr. 18, 2013

(51) Int. Cl.
*H03H 7/30*      (2006.01)

(52) U.S. Cl.
USPC ........... 375/233; 375/229; 375/323; 375/346; 333/18; 333/28 R; 708/300; 455/296; 327/551

(58) Field of Classification Search
USPC .......... 375/233, 229, 232, 346; 333/18, 28 R; 708/300; 455/296; 327/551
See application file for complete search history.

(56) References Cited

U.S. PATENT DOCUMENTS

| | | | |
|---|---|---|---|
| 6,707,848 B2 | 3/2004 | Agazzi et al. | |
| 6,721,916 B2 | 4/2004 | Agazzi et al. | |
| 6,754,293 B1 * | 6/2004 | Henriksson et al. | 375/346 |
| 6,823,483 B1 | 11/2004 | Creigh | |
| 6,944,237 B2 | 9/2005 | Agazzi et al. | |
| 6,947,482 B2 | 9/2005 | Azazzi et al. | |
| 7,177,352 B1 | 2/2007 | Plasterer et al. | |
| 7,254,194 B2 | 8/2007 | Lin et al. | |
| 7,339,989 B1 * | 3/2008 | McAdam et al. | 375/232 |
| 7,570,701 B2 | 8/2009 | Agazzi et al. | |
| 7,711,077 B2 | 5/2010 | Agazzi et al. | |
| 7,738,549 B2 | 6/2010 | Abnous et al. | |
| RE42,558 E * | 7/2011 | Chung et al. | 375/233 |
| 2003/0016770 A1 | 1/2003 | Trans et al. | |
| 2003/0086515 A1 | 5/2003 | Trans et al. | |
| 2004/0008765 A1 | 1/2004 | Chung et al. | |
| 2009/0097538 A1 | 4/2009 | Aziz et al. | |
| 2009/0161747 A1 | 6/2009 | Aziz et al. | |
| 2010/0309963 A1 | 12/2010 | Agazzi et al. | |

\* cited by examiner

*Primary Examiner* — Leon Flores
(74) *Attorney, Agent, or Firm* — Myers Wolin, LLC

(57) ABSTRACT

A PAM-N decision feedback equalizer (DFE) comprises a coefficient computation unit; a feedback unit that mitigates, using computed feedback coefficients, effects of interference from data symbols; an error-and-decision unit for at least computing a least error value respective to one of a plurality of decision levels, wherein the least error value indicates a difference of a pseudo equalized input PAM-N data symbol from an optimal position of the one of the plurality of decision levels, wherein the one of the plurality of decision levels corresponds to a modulation level used to modulate data in the input PAM-N data symbol; and a calibration unit for adaptively setting the plurality of decision levels based, in part, on the least error value, thereby enabling for compensating for gain changes resulted by a cable on which the input PAM-N data symbol is received and further compensating for embedded offsets of the error-and-decision unit.

18 Claims, 3 Drawing Sheets

TECHNIQUES FOR ADAPTIVELY ADJUSTING DECISION LEVELS OF A PAM-N DECISION FEEDBACK EQUALIZER

TECHNICAL FIELD

The invention relates to decision feedback equalizers, and more particularly, to setting reference voltage levels of a decision feedback equalizer that equalizes a PAM-N signal.

BACKGROUND OF THE INVENTION

High-speed interface links connecting two devices over a physical cable are typically serial communication links. Examples for such links include, but are not limited to, a high-definition multimedia interface (HDMI), a digital video interface (DVI), DisplayPort (DP), Universal Serial Bus 3 (USB3), and others.

During the process of data transmission, a transmitter continuously transmits signals to a receiver over the physical medium (cable). Typically, the physical cable exhibits the characteristics of a low-pass filter. Therefore, the amplitude of the data, received at the receiver, is attenuated and the phase is distorted. Also, the physical cable typically consists of wires which are not perfectly shielded. Thus, noise is present in the data due to cross coupling between signals from different wires.

The process of correcting the cable induced distortion is called equalization. This process can be performed by a decision feedback equalizer (DFE) that suppresses distortions caused by previously transmitted signals according to the continuously estimated impulse response of the interface between the transmitter and receiver. In practice, a DFE equalizes signals based on various parameters, such as digital filter taps or feedback coefficients, which are adjusted on the basis of estimated channel characteristics. The feedback coefficients are set to subtract the effects of interference from signals (e.g., symbols) that are adjacent in time to the desired signal (symbol). Typically, the coefficients are selected and adjusted using a least mean squares (LMS) algorithm.

An exemplary diagram of a decision feedback equalizer (DFE) 100 is provided in FIG. 1. The feedback filter 110 is used to adjust the tap coefficients. The number of feedback coefficients in the feedback filter 110 determines the number of previous symbol decisions which affect the current DFE decisions. With this aim, the feedback filter 110 attempts to model the distortion in a current signal to be equalized (input signal $I_n$) based on previously transmitted symbols using an LMS algorithm. A slicer 120 detects the value of the symbol that best corresponds to a value $Out_n$ that an adder 130 outputs to detect a symbol signal SYM. A difference between the input to the slicer 120 $Out_n$ and the output of the slicer 120 SYM is the symbol error $E_n$ computed by an adder 140. In an ideal system, the symbol error $E_n$ should essentially be zero. That is, the output $Out_n$ of the adder 130 should correspond to the received signal ($I_n$) for the current symbol. The voltage levels generator 150 presets the reference voltage levels that define the crossing points of the slicer 120.

Transmitted serial signals can be modulated using, for example, N-pulse amplitude modulation (PAM-N), where N discrete voltage levels are used to encode input bits. The two common PAM techniques utilized to modulate high-speed serial signals are PAM-2 (also known as non-return-to-zero "NRZ") or PAM-4. In a PAM-2, two levels are used to encode a single bit. In a PAM-4, two bits are mapped to one of four possible differential voltage levels, for example, +3 volts, +1 volt, −1 volt, and −3 volts. Demodulation is performed by detecting the amplitude level of the carrier at every symbol period. The PAM-4 allows transmitting signals at double the rate of the PAM-2 signal, but the loss of PAM-4 modulated signals is higher than that of PAM-2 modulated signals. Experiments have shown that when the loss of the physical medium is more than 10 dB, the PAM-4 had been used in preference to PAM-2.

When a receiver includes a DFE, such as DFE 100, the mapping of an input PAM-4 signal to two output bits is performed by means of the slicer 120. With this aim, the slicer 120 includes three comparators (not shown). An equalized signal is compared to three different reference voltage levels $VREF_1$, $VREF_2$, and $VREF_3$. Each comparator compares an equalized PAM-4 signal to one of the reference voltage levels $VREF_1$, $VREF_2$, and $VREF_3$. Each reference voltage level ($VREF_1$, $VREF_2$, or $VREF_3$) is typically set relative to a common-mode voltage level. Then, the 2 bits modulated in the PAM-4 signal are determined based on the crossing of the reference voltage levels $VREF_1$, $VREF_2$, and $VREF_3$.

The voltage levels generator 150 sets the reference voltage levels $VREF_1$, $VREF_2$, and $VREF_3$. These levels are set to nominal values to achieve proper detection of the signal. However, the comparators include an embedded offset that may bias the decision. Such an offset is a function of many parameters including, for example, manufacturing/fabrication attributes. To compensate for the comparator offset, the DFE should implement an offset cancellation mechanism which requires additional complex circuitry to the DFE.

The input signal is transmitted through a cable that determines, in part, the attenuation of the signal. Therefore, a gain is applied to the input signal to bring the level of the input signal to nominal decision levels. This is performed during power-up of the receiver by means of a variable gain amplifier (VGA) 160. Setting the gain by the VGA 160 also determines the sensitivity of the receiver. The VGA 160 is set during a power-up of the receiver. However, the attenuation of the cable may be changed during normal operation of the receiver, for example, due to a temperature change at the cable environment, wear and tear of the cable, and so on.

Therefore, it would be advantageous to provide an efficient solution for adaptively setting the gain and decision level of a PAM-N DFE.

SUMMARY OF THE INVENTION

Certain embodiments disclosed herein include a multi-level pulse amplitude modulation (PAM-N) decision feedback equalizer (DFE). The DFE comprises a coefficient computation unit for setting feedback coefficients of the DFE; a feedback unit that mitigates, using the feedback coefficients, effects of interference from data symbols that are adjacent in time to an input PAM-N data symbol; an error-and-decision unit for at least computing a least error value respective to one of a plurality of decision levels, wherein the least error value indicates a difference of a pseudo equalized input PAM-N data symbol from an optimal position of the one of the plurality of decision levels, wherein the one of the plurality of decision levels corresponds to a modulation level used to modulate data in the input PAM-N data symbol; and a calibration unit for adaptively setting the plurality of decision levels based, in part, on the least error value, thereby enabling for compensating for gain changes resulted by a cable on which the input PAM-N data symbol is received and further compensating for embedded offsets of the error-and-decision unit.

Certain embodiments disclosed herein also include A method for adaptively adjusting a plurality of decision levels of a N-pulse amplitude modulation (PAM-N) decision feedback equalizer (DFE). The method comprises setting feedback coefficients of the DFE; mitigating, using the feedback coefficients, effects of interference from data symbols that are adjacent in time to an input PAM-N data symbol; computing a least error respective of one of the plurality of decision levels, wherein the least error indicates a difference of a pseudo equalized input PAM-N data symbol from an optimal position of the one of the plurality of decision levels, wherein one of the plurality of decision levels corresponds to a modulation level used to modulate data in the input PAM-N data symbol; and adaptively setting the plurality of decision levels based, in part, on the least error, thereby compensating for gain changes resulted by a cable on which the input PAM-N data symbol is received.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
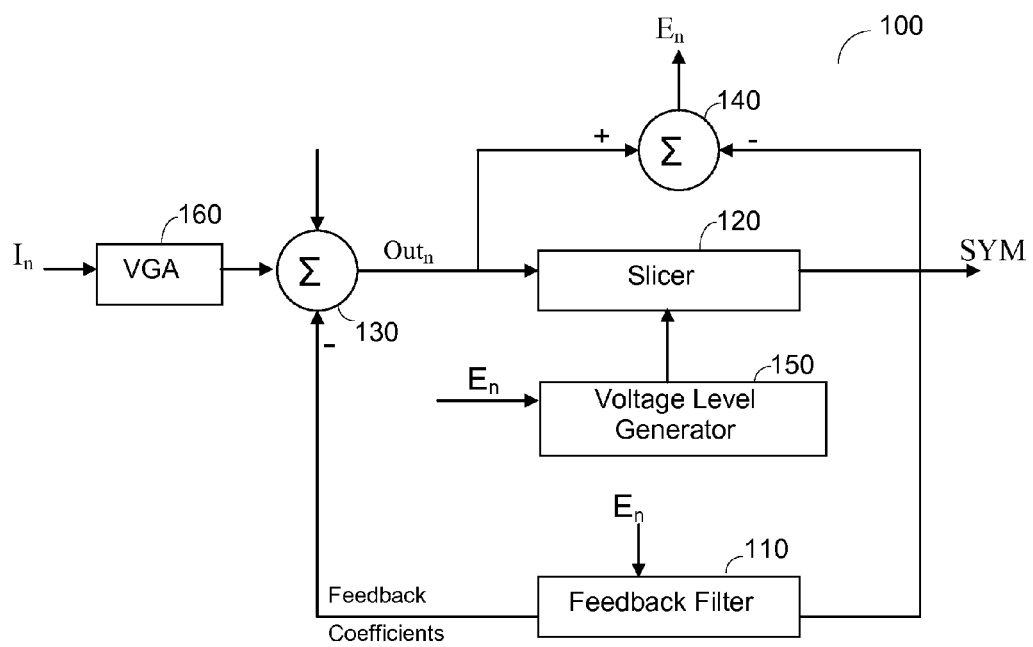
FIG. 1 is a schematic diagram of a conventional decision feedback equalizer (DFE).

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention includes techniques for compensating for changes in the cable attenuation and comparators offset by adaptively adjusting decision levels of a DFE utilized in PAM-N receivers. This is achieved without any means of variable gain amplifiers or offset cancellation mechanisms. The decision levels are adjusted based, in part, on errors generated by the DFE during the operation of receiver. Thus, the embodiments disclosed herein can adaptively compensate gain and comparator offset changed due to, for example, flections in the power signal, and/or temperature in the cable and/or comparators. In a preferred embodiment, the techniques discussed herein are applicable to a DFE equalizing PAM-4 signals.

Figure 2:
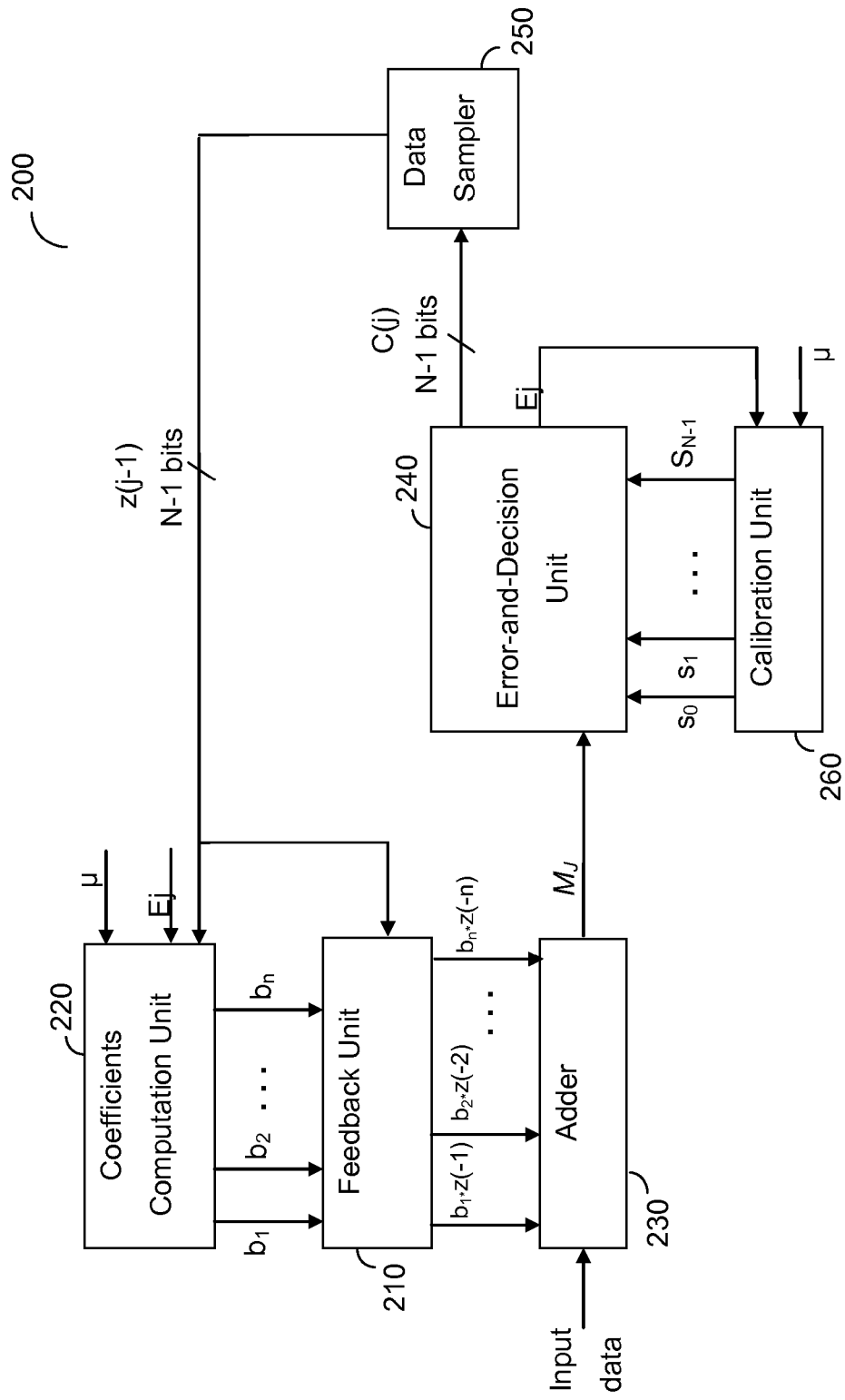
FIG. 2 is a block diagram of a DFE utilized to describe certain embodiments of the invention.

FIG. 2 shows an exemplary and non-limiting block diagram of a DFE 200 according to an embodiment of the invention. The decision levels of the DFE 200 are adjusted according to various embodiments of the invention disclosed in greater detail below. The DFE 200 includes a feedback (FB) unit 210, a coefficients computation unit 220, an adder 230, an error-and-decision (ED) unit 240, a data sampler 250, and a calibration unit 260.

The feedback unit 210, in one embodiment, is a delay line with several delays, each of which corresponds to the symbol duration. The feedback coefficients b1, . . . , bn are set to subtract the effects of interference from data symbols that are adjacent in time to the current received input data symbol. The coefficients computation unit 220 computes and sets the value of the feedback coefficients b1, . . . , bn. In one embodiment of the invention, the coefficients are determined using an LMS algorithm which approximates the steepest descent algorithm. The LMS algorithm is controlled by an adaptation coefficient µ, which determines the pace of the convergence. However, at some point the LMS algorithm becomes unstable.

According to another embodiment, the feedback coefficients are set using a scanning process that determines the feedback coefficients that result in the best equalization quality. The scanning process is described in detail in a co-pending U.S. application Ser. No. 13/230,244 titled "TECHNIQUES FOR SETTING FEEDBACK COEFFICIENTS OF A PAM-N DECISION FEEDBACK EQUALIZER" assigned to the common assignee and hereby incorporated by reference.

The adder 230 computes the signal M(j) by subtracting from the input data symbols the sum of the feedback coefficients [b1, . . . , bn] multiplied by their respective delay (z). This is performed in order to ensure that the output of the adder 230, M(j), corresponds to the current symbol, thus cancelling intersymbol interference (ISI) of the input data symbol.

The ED 240 maps the M(j) to the bits modulated in the input signal and generates error (E) values. Each error value is the difference of a current symbol M(j) from an optimal decision level of one of the modulation levels of the ED 240. The operation of the ED 240 will be described in detail below with reference to FIG. 3. In an embodiment, the least error value of the computed values is output to the calibration unit 260. The data sampler 250 samples the N−1 bits at the output of the ED unit 240 and provides the sampled bits to the Coefficient Computation unit 220.

The calibration unit 260 adaptively adjusts the decision levels, $S_0, \ldots, S_{N-1}$ based on the generated error ($E_k$) values and an adaptation coefficient µ. For example, a PAM-4 signal is modulated using four different levels: +3 v; +1 v; −1 v; and −3 v, then the calibration unit 260 generates decision levels $S_0$; $S_1$; $S_2$; and $S_3$ corresponding to the modulation levels of a PAM-4 signal.

The adjustment of the decision levels $S_0, \ldots, S_{N-1}$ compensates for changes in the cable attenuation, thus the calibration unit 260 allows controlling the gain and sensitivity of the receiver. For example, if the decision levels in a PAM-4 DEF are set to −450 mv, −150 mv, 150 mv, 450 mv and the received symbols are −450 mv, −150 mv, 150 mv, 450 mv, there is a gain of 1. Increasing the decision levels is equivalent to inserting a gain. For example, increasing the decision level from 450 mv to 600 mv is equivalent to amplifying the input signal by 1.33 (600/450=1.33).

According to one embodiment, the calibration unit 260 adjusts the decision level $S_k$ {0, . . . , N−1} to zero an average error resulting from a current value of a decision level for a symbol j. Thus, the calibration unit 260 sets the decision levels using the following equation:

$$S_k(j) = S_k(j-1) + \mu(\text{sign}(E_k(j))) \qquad [1]$$

where 'k' is the current decision level being computed, µ is the adaptation speed factor, $E_k$ is an error value generated by the ED unit 240 respective of the current decision level $S_k$, and T is an index of the current symbol being processed. It should be noted that the calibration unit 260 brings the decision levels $S_K$ to their optimal positions during normal operation of the receiver.

In another embodiment of the invention, the calibration unit 260 initially sets the decision levels of $S_0$ and $S_{N-1}$ using a PAM-2 (NRZ) modulated input signal. Once the error value is small enough, i.e., below a predefined threshold, the value of $S_0$ and $S_{N-1}$ are converged. Then, the calibration unit 260 sets the decision levels ($S_0$ through $S_{N-1}$) using a PAM-N modulated input signal according to equation [1].

The calibration unit 260 independently computes and sets the different decision levels ($S_k$). Therefore, an offset of an individual comparator in the ED 240 can be cancelled. In addition, the common offset of all the comparators in the ED 240 can be cancelled using the decision levels. It should be appreciated that the decision levels ($S_k$) are determined based, in part, on the $E_k$ value, which is a function of a M(j). As mentioned above, the symbol M(j) is an input PAM-N symbol equalized using the feedback coefficients. Thus, the decision level $S_k$ is dependent on the cable, the feedback coefficients and the timing of the DFE 200. The decision level $S_k$ converges to an optimal value when the respective computed error $E_k$ equals to zero.

Figure 3:
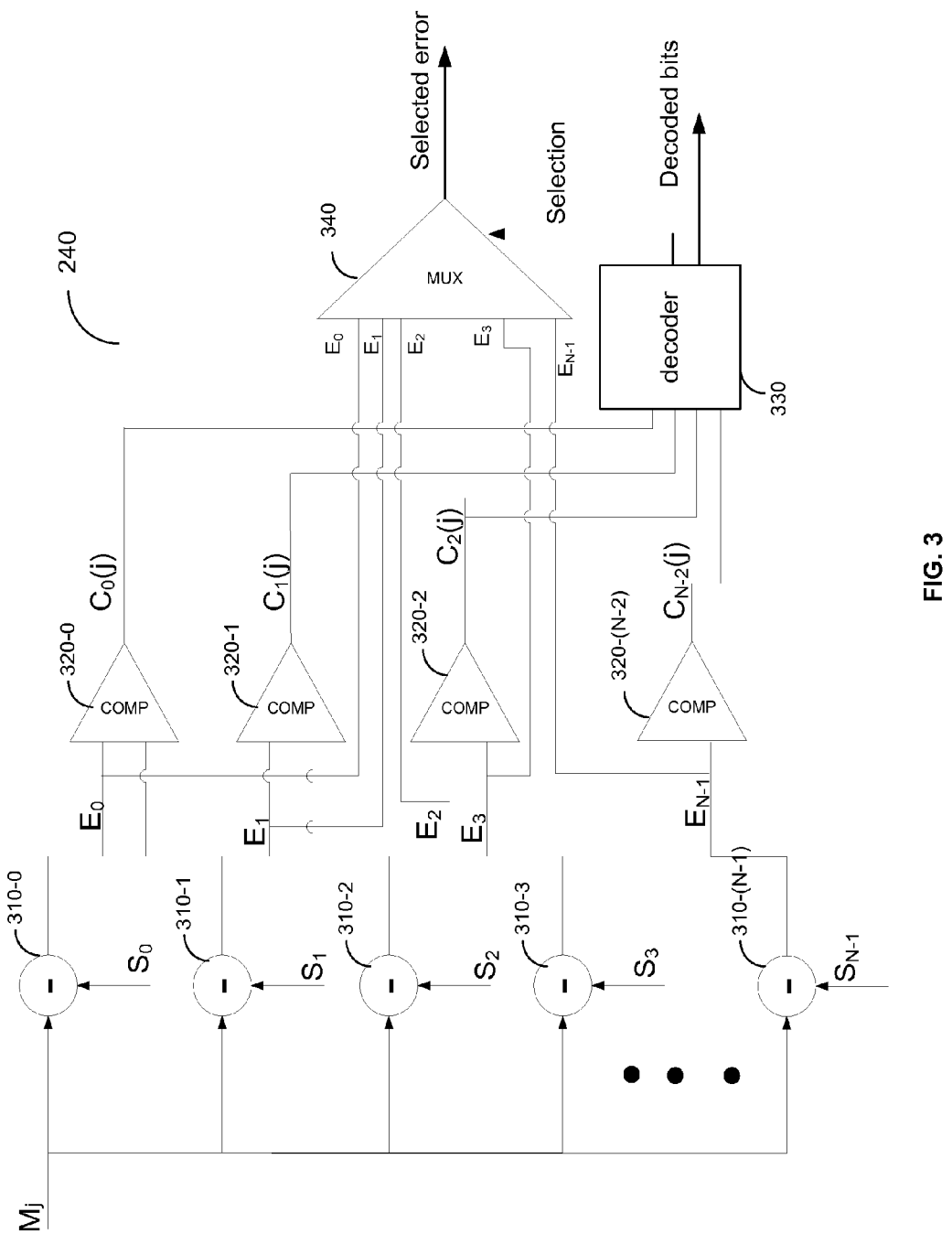
FIG. 3 is a non-limiting and exemplary block diagram of the ED 240 of a PAM-N DFE according to an embodiment of the invention.

FIG. 3 shows a non-limiting and exemplary block diagram of the ED 240 of a PAM-N DFE implemented according to an embodiment of the invention. The ED 240 includes a number of N adders 310-0 through 310-(N−1) connected to a number of N−1 comparators 320-0 through 320-(N−2), a decoder 330, and a multiplexer 340. The parameter N is the number of discrete voltage levels used in the PAM-N modulation. The current symbol M(j) is fed to the adders 310-0 through 310-(N−1), each of which substrates the symbol M(j) from a respective decision level to generate a respective error. For example, $E_0$=M(j)−$S_0$; $E_1$=M(j)−$S_1$; and so on.

The multiplexer 340 outputs lower error value out of the N errors computed by the adders 310-0 through 310-(N−1). The calibration unit 260 uses the least error to adjust the decision level respective of the error. For example, error $E_0$ is used in the adjustment of the decision level $S_0$. In one embodiment, the calibration unit 260 adjusts the respective decision level $S_k$ using equation [1]. As mentioned above, the calibration unit 260 computes and adjusts the decision levels $S_k$ {k=0, . . . , N−1} so that the average value of the respective error $E_k$ will be zero. The selection signal is generated by the decoder 330 which selects the least error value out of the N generated errors.

Each comparator 320-0 through 320-(N−2) receives two error values computed for two adjacent decision levels and produces a decision $C_k$(j) that allows the decoder 330 to determine the least error from the computed error values. A decision $C_k$(j) is based only on the values of the comparator's input error values. In one embodiment, the decision $C_k$(j) indicates if the sum of two input error values is positive. For example, the comparator 320-0 receives errors $E_0$ and $E_1$ and outputs a decision $C_0$(j)='1' if their sum is positive; otherwise, $C_0$(j)='0'. In another embodiment, the decision $C_k$(j) indicates if the absolute value of one input error is higher than the absolute value of the other input value. For example, the comparator 320-0 receives errors $E_0$ and $E_1$ and outputs a decision $C_0$(j)='1' if their $|E_1|>|E_0|$ sum is positive; otherwise, $C_0$(j)='0'.

The output of each of the comparators 320-0 through 320-(N−2) is fed to the decoder 330 which is utilized to recover the data (i.e., the N−1 modulated bits) based on the least error. In addition, an error selection signal is generated, based on the least error $E_0$, . . . , $E_{N-1}$, and then fed to the multiplexer 340 to output the correct error for the calibration unit 260.

Following is a non-limiting example demonstrating the operation of the ED 240 for a PAM-4 signal. A PAM-4 signal can be modulated using 4 levels −3.0 v; +1.0 v; −1.0 v; and −3.0 v. In the above example, the decision levels are as follows: $S_0$=3.0 v; $S_1$=1.0 v; $S_2$=−1.0 v; and $S_3$=−3.0 v. The voltage level of the M(j) symbol is 3.1 v. Thus, the error values are as follows: $E_0$=0.1 v; $E_1$=2.1 v; E2=4.1 v; and E3=6.1 v. Thus, the decisions $C_0$(j), $C_1$(j) and $C_2$(j) output by the comparators 320-0 through 320-2 indicate '1' as the sum of all errors is positive.

The detector 340 determines the least error out of errors $E_0$, $E_1$, $E_2$ and, $E_3$ and based on such determination outputs a 2-bit modulated in the PAM-4 signal. In this example, $E_0$ is mapped to '00'. In a non-limiting implementation, the decoder 330 can apply the following decoding:

| M(j) voltage level | Comparator decisions $C_0$(j); $C_1$(j); $C_2$(j) | Least error | Recovered 2-bit |
|---|---|---|---|
| M(j) > 2 v | 1; 1; 1 | $E_0$ | 00 |
| 2 v < M(j) < 0 v | 0; 1; 1 | $E_1$ | 01 |
| 0 > M(j) > −2 v | 0; 0; 1 | $E_2$ | 11 |
| M(j) < −2 v | 0; 0; 0 | $E_3$ | 10 |

Other decoding options will be apparent to one of ordinary skill based on the teachings discussed herein.

If the voltage level of the M(j) symbol changes to 2.9 v, then the decisions $C_0$(j); $C_1$(j); $C_2$(j) would all remain at '1', and the least error is $E_0$. However, the value of the selected error $E_0$ is changed from 0.1 v to −0.1 v. A change in the error value $E_0$ would require the calibration unit 260 to adjust the decision level $S_0$ according to equation [1] above.

Thus, based on this example, as the M(j) levels are around +3 v, then the respective error $E_0$ would be on average 0. This ensures that $S_0$ would converge to a decision level that represents the highest level of a PAM-4 symbol, any offset results from the comparators or cable attenuation.

The various embodiments of the invention may be implemented as any combination of hardware, firmware, and software. Moreover, the software is preferably implemented as an application program tangibly embodied on a program storage unit or computer readable medium. One of ordinary skill in the art would recognize that a "machine readable medium" or computer readable medium is a non-transitory medium capable of storing data and can be in a form of a digital circuit, an analogy circuit, a magnetic media or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention.

What is claimed is:

1. A multi-level pulse amplitude modulation (PAM-N) decision feedback equalizer (DFE), comprising:
   a coefficient computation unit for setting feedback coefficients of the DFE; and
   a feedback unit configured to mitigate, using the feedback coefficients, effects of interference from data symbols that are adjacent in time to an input PAM-N data symbol;
   an error-and-decision unit comprises a number of N of adders, wherein each of the N adders subtracts the pseudo equalized input PAM-N data symbol from one of the plurality of decision levels generated by the calibration unit to produce a number of N error values, a number of N−1 comparators coupled to the N adders, wherein each of the N−1 comparators generates a decision used to determine the least error value out of all the computed error values, a decoder for recovering the data based on the error values and for generating a selection signal, and a multiplexer coupled to the N adders and the decoder, the multiplexer outputs the least error out of the computed error values based on the selection signal, wherein the error-and-decision unit is configured to compute a least error value respective to one of a plurality of decision levels and to recover the data modulated in the input PAM-4 data symbol, wherein the least error value indicates a difference of a pseudo equalized input PAM-N data symbol from an optimal position of the one of the plurality of decision levels, wherein the one of the plurality of decision levels corresponds to a modulation level used to modulate data in the input PAM-N data symbol; and
   a calibration unit for adaptively setting the plurality of decision levels based, in part, on the least error value, thereby enabling for compensating for gain changes resulted by a cable on which the input PAM-N data symbol is received and further compensating for embedded offsets of the error-and-decision unit.

2. The DFE of claim 1, further comprises:
   an adder for cancelling intersymbol interference (ISI) of the input PAM-N data symbol by subtracting from the input PAM-N data symbol a sum of signals outputted by the feedback unit to generate the pseudo equalized input PAM-N data symbol.

3. The DFE of claim 1, further comprises:
   a data sampler for sampling the recovered data output by the error-and-decision unit and feeding the sampled data to the coefficient computation unit and the feedback unit.

4. The DFE of claim 1, wherein N is the number of modulation levels of the PAM-N.

5. The DFE of claim 1, wherein the calibration unit is further configured to independently adjust each of the plurality of the decision levels.

6. The DFE of claim 5, wherein the adjustment of each of the plurality of the decision levels is determined by:
   $S_k(j)=S_k(j-1)+\mu(\text{sign}(E_k(j)))$, wherein 'k' is the one of the plurality of decision levels, $\mu$ is an adaptation speed factor, '$E_k$' is the least error; and 'j' is an index of the input PAM-N data symbol.

7. The DFE of claim 1, wherein the PAM-N DFE is a PAM-4 DFE, and the input PAM-N data symbol is a PAM-4 modulated signal.

8. A method for adaptively adjusting a plurality of decision levels of a N-pulse amplitude modulation (PAM-N) decision feedback equalizer (DFE), comprising:
   setting feedback coefficients of the DFE;
   mitigating, using the feedback coefficients, effects of interference from data symbols that are adjacent in time to an input PAM-N data symbol;
   computing a least error respective of one of the plurality of decision levels, wherein the least error indicates a difference of a pseudo equalized input PAM-N data symbol from an optimal position of the one of the plurality of decision levels, wherein one of the plurality of decision levels corresponds to a modulation level used to modulate data in the input PAM-N data symbol, wherein computing the least error further comprises subtracting the pseudo equalized input PAM-N data symbol from each of the plurality of decision levels generated by the calibration unit to produce N error values, comparing two error values corresponding to two adjacent decision levels, generating N−1 decisions based on the comparison results, wherein the generated N−1 decisions are used to determine the least error out of the N computed error values, recovering the data based on the N−1 decisions, and selecting the least error out of the computed N error values; and
   adaptively setting the plurality of decision levels based, in part, on the least error, thereby compensating for gain changes resulted by a cable on which the input PAM-N data symbol is received.

9. The method of claim 8, further comprising:
   cancelling intersymbol interference (ISI) of the input PAM-N data symbol by subtracting from the input PAM-N data symbol a sum of signals outputted by the feedback unit to produce the pseudo equalized input PAM-N data symbol.

10. The method of claim 9, further comprising:
    recovering the data modulated in the input PAM-4 data symbol.

11. The method of claim 10, further comprising
    sampling the recovered data; and
    using the sampled data for at least computing the feedback coefficients of the DFE.

12. The method of claim 8, wherein N is the number of modulation levels of the PAM-N.

13. The method of claim 8, further comprising:
    independently adjusting each of the plurality of the decision levels.

14. The method of claim 13, wherein the adjustment of each of the plurality of the decision levels is determined by:
    $S_k(j)=S_k(j-1)+\mu(\text{sign}(E_k(j)))$, wherein 'k' is the one of the plurality of decision levels, $\mu$ is an adaptation speed factor, '$E_k$' is the least error; and 'j' is an index of the input PAM-N data symbol.

15. The method of claim 14, wherein the PAM-N DFE is a PAM-4 DFE, and the input PAM-N data symbol is a PAM-4 modulated signal.

16. The method of claim 8, wherein adaptively setting the plurality of decision levels further allows for compensating offsets that biased one or more of the plurality of decision levels.

17. A non-transitory computer readable medium having stored thereon instructions for causing one or more processing units to execute the method according to claim 8.

18. A multi-level pulse amplitude modulation (PAM-N) decision feedback equalizer (DFE), comprising:
    a coefficient computation unit for setting feedback coefficients of the DFE;

a feedback unit that mitigates, using the feedback coefficients, effects of interference from data symbols that are adjacent in time to an input PAM-N data symbol;

an error-and-decision unit for at least computing a least error value respective to one of a plurality of decision levels, wherein the least error value indicates a difference of a pseudo equalized input PAM-N data symbol from an optimal position of the one of the plurality of decision levels, wherein the one of the plurality of decision levels corresponds to a modulation level used to modulate data in the input PAM-N data symbol; and a calibration unit for adaptively setting the plurality of decision levels based, in part, on the least error value, thereby compensating for gain changes resulting from a cable on which the input PAM-N data symbol is received and further compensating for embedded offsets of the error-and-decision unit, wherein the calibration unit is further configured to independently adjust each of the plurality of the decision levels, the adjustment of each of the plurality of the decision levels is determined by $S_k(j)=S_k(j-1)+\mu(\text{sign}(E_k(j)))$, wherein 'k' is the one of the plurality of decision levels, $\mu$ is an adaptation speed factor, '$E_k$' is the least error; and 'j' is an index of the input PAM-N data symbol.

* * * * *